United States Patent

Flach et al.

[11] Patent Number: 5,905,203
[45] Date of Patent: May 18, 1999

[54] MICROMECHANICAL ACCELERATION SENSOR

[75] Inventors: Georg Flach, Grafenau; Udo Nothelfer, Nersingen; Günther Schuster, Gammelshausen; Heribert Weber, Kirchheim/Teck, all of Germany

[73] Assignee: Temic Telefunken microelectronic GmbH, Heilbronn, Germany

[21] Appl. No.: 08/723,545

[22] Filed: Sep. 30, 1996

[30] Foreign Application Priority Data

Nov. 7, 1995 [DE] Germany ............................ 195 41 388

[51] Int. Cl.⁶ ................................................ G01P 15/125
[52] U.S. Cl. ....................................... 73/514.32; 73/514.36
[58] Field of Search ............................ 73/514.32, 514.18, 73/514.36, 514.37; 361/280, 283.1

[56] References Cited

U.S. PATENT DOCUMENTS

| | | | |
|---|---|---|---|
| 4,483,194 | 11/1984 | Rudolf | 73/514.32 |
| 4,736,629 | 4/1988 | Cole | 73/514.32 |
| 4,918,032 | 4/1990 | Jain et al. | 437/228 |
| 5,054,320 | 10/1991 | Yvon | 73/514.18 |
| 5,095,401 | 3/1992 | Zavracky et al. | 73/514.32 |
| 5,303,589 | 4/1994 | Reidemeister et al. | 73/514.32 |
| 5,447,067 | 9/1995 | Biebl et al. | 73/514.32 |
| 5,581,035 | 12/1996 | Greiff | 73/514.32 |
| 5,623,099 | 4/1997 | Schuster et al. | 73/514.32 |
| 5,629,243 | 5/1997 | Cahill et al. | 73/514.32 |
| 5,659,195 | 8/1997 | Kaiser et al. | 73/514.18 |

FOREIGN PATENT DOCUMENTS

| | | |
|---|---|---|
| 3703793 | 8/1988 | Germany . |
| 3824695 | 11/1990 | Germany . |
| 4126100 | 2/1993 | Germany . |
| 4310170 | 10/1994 | Germany . |
| 4446890 | 6/1995 | Germany . |
| 3223987 | 8/1995 | Germany . |
| 4427515 | 8/1995 | Germany . |
| 4421337 | 12/1995 | Germany . |
| 2101336 | 1/1983 | United Kingdom . |

*Primary Examiner*—John E. Chapman
*Attorney, Agent, or Firm*—Venable; George H. Spencer; Norman N. Kunitz

[57] ABSTRACT

A micromechanical acceleration sensor consists of a first semiconductor wafer and a second semiconductor wafer, where on the first semiconductor wafer first and second electrodes, are provided to create a variable capacitance and the second semiconductor wafer has a movable third electrode, and where on the first semiconductor wafer there is a microelectronic evaluation unit. The moveable electrode is a rocker suspended asymmetrically with regard to an axis of rotation such that each respective portion is of a different length and is opposite one of the first and second electrodes. A closed ring structure is disposed on the surface of the first semiconductor wafer.

6 Claims, 4 Drawing Sheets

MICROMECHANICAL ACCELERATION SENSOR

BACKGROUND OF THE INVENTION

The invention relates to a micromechanical acceleration sensor manufactured from a first semiconductor wafer and a second semiconductor wafer, where on the first semiconductor wafer at least a first electrode is provided to create a variable capacitance and the second semiconductor wafer has a movable second electrode, and where on the first semiconductor wafer there is a microelectronic evaluation unit.

A capacitive state-of-the-art acceleration sensor is known, for instance, from the patent publication U.S. Pat. No. 4,483,194. The sensor described there has a tongue structure made by means of the so-called "bulk micromechanical" method. The change in its capacitance, resulting from an acceleration force acting on the sensor, is evaluated with a separate circuit arrangement.

This sensor has the disadvantage that in the manufacture of the sensor a process is used whereby the wafer used must be completely etched through from its reverse side. Owing to the given crystallographic etching angle, additional expensive silicon area is therefore required. Furthermore, the sensor element must be packaged with two more wafers in order to be hermetically sealed.

SUMMARY OF THE INVENTION

The object of the invention is to provide a capacitive acceleration sensor in order to avoid the disadvantages stated above.

According to the invention there is a micromechanical acceleration sensor consisting of a first semiconductor wafer and a second semiconductor wafer, where on the first semiconductor wafer at least a first electrode is provided to create a variable capacitance and the second semiconductor wafer has a movable second electrode, and where on the first semiconductor wafer there is a microelectronic evaluation unit.

The advantages of the invention are that the manufacture of the evaluation electronics and the micromechanical sensor can take place separately and with the technology that is optimal in either case, and that the end product is still a single chip. Because the chips on which the evaluation electronics is integrated provide hermetic encapsulation of the sensor, there is no need for an expensive hermetically sealed housing. Additionally, the fundamental design of the sensor according to the invention results in a very high dynamic response.

An embodiment example of the invention is described in detail below and portrayed in the Figures.

DESCRIPTION OF THE PREFERRED EMBODIMENTS

Figure 1:
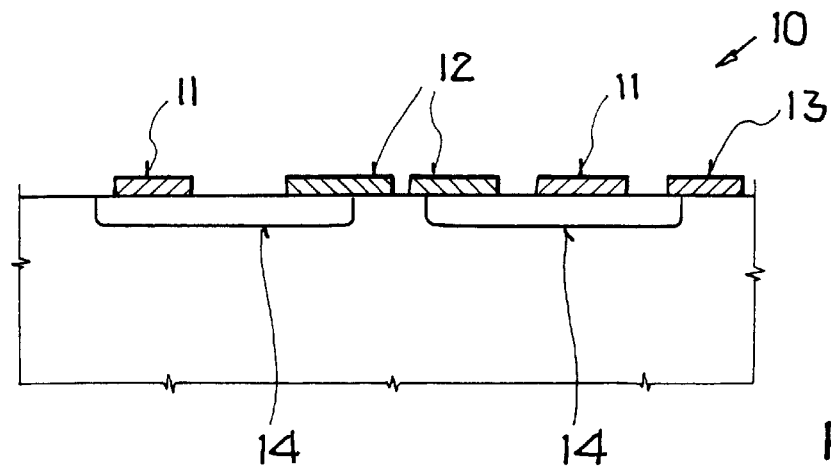
FIG. 1 is a sectional view of a first wafer with an integrated evaluation circuit.

FIG. 1 shows a section through a first wafer 10 of silicon on which an application-specific integrated circuit 14, known by the acronym ASIC, is arranged. The integrated circuit 14 is made by conventional means, preferably with CMOS technology. Two electrodes 12 of good conductive material (metal layer or polysilicon layer) are situated at defined places. Around the electrodes 12, on the surface of the silicon wafer 10, there is a closed ring structure 11, made preferably of the material of the upper metallization layer, generally aluminum.

Figure 2:
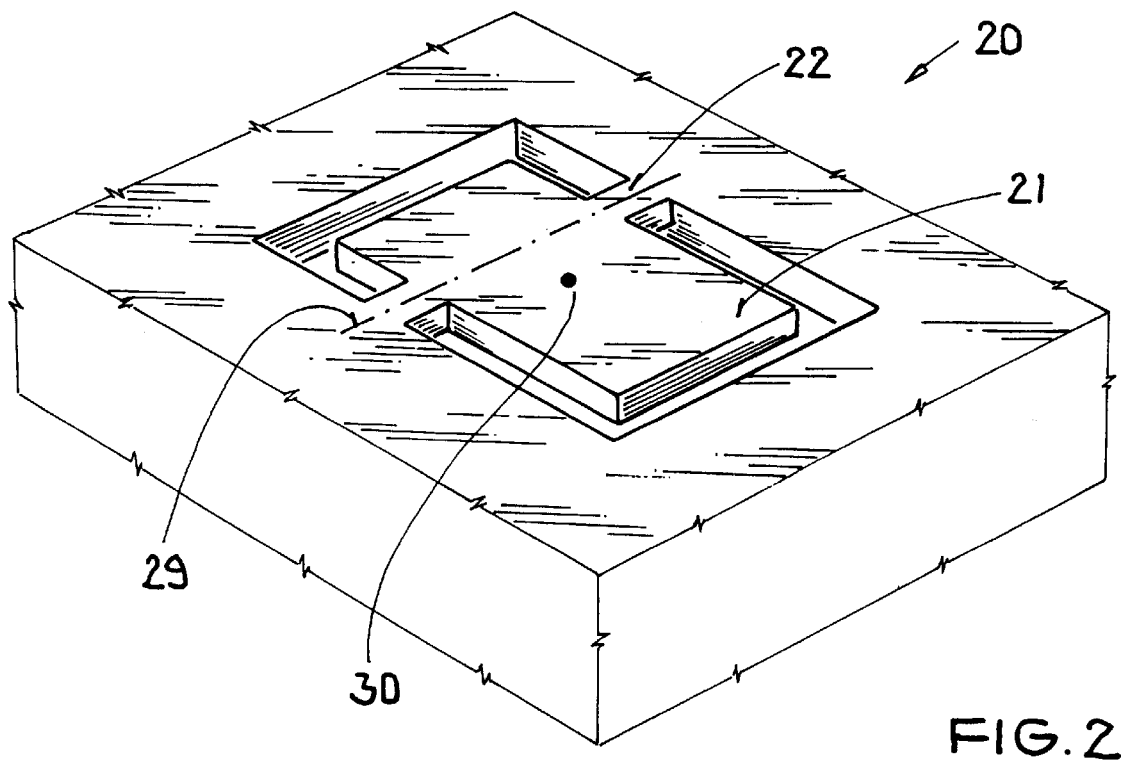
FIG. 2 is a perspective view of a second wafer with an acceleration sensor.

FIG. 2 shows a second wafer 20 in which a micromechanical part in the form of a rocker 21 is provided by known means. A so-called SOI wafer (Silicon On Insulator) is preferred, where an insulating layer 23 (FIG. 3) of $SiO_2$ is applied to the silicon wafer 20 and where a silicon layer 24 (FIG. 3) is in turn applied to insulating layer 23 and where the thickness of the insulating layer 23 is approx. 1 to 2 $\mu$m and the thickness of the silicon layer 24 approx. 10 $\mu$m. The rocker 21 is joined to the SOI wafer 20 through two connecting pieces 22 made by micromechanical means such that an asymmetric axis of rotation 29 results away from the center of gravity of the rocker 21.

Figure 3:
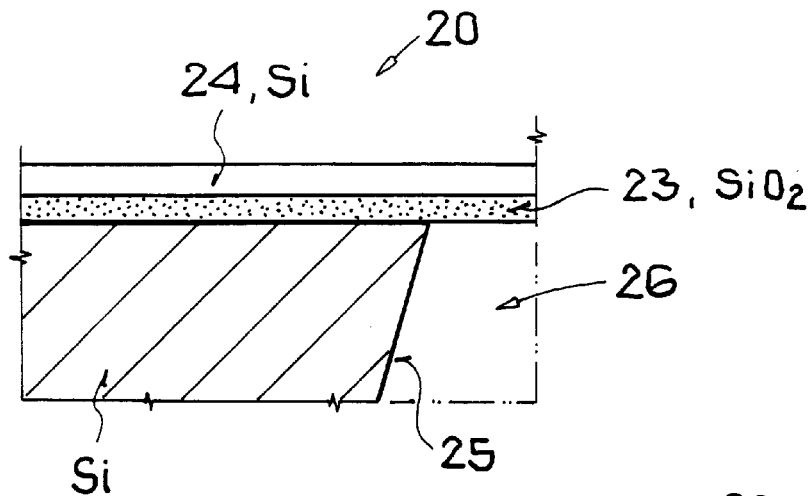
FIG. 3 is a sectional view through the second wafer during an etching operation.

In FIG. 3 it can be seen how the SOI wafer 20 is etched in manufacture, initially from one side up to the insulating layer 23 by means of an anisotropic etching process, resulting in an etching edge 25 and a recess 26 in the SOI wafer 20. The recess 26 makes it possible to access bondpads 13 (FIG. 7) on the silicon wafer 10 after sawing the SOI wafer 20. Oxide, nitride or, preferably, an oxide-nitride compound can be used as masking materials (not shown in the Figures).

Figure 4:
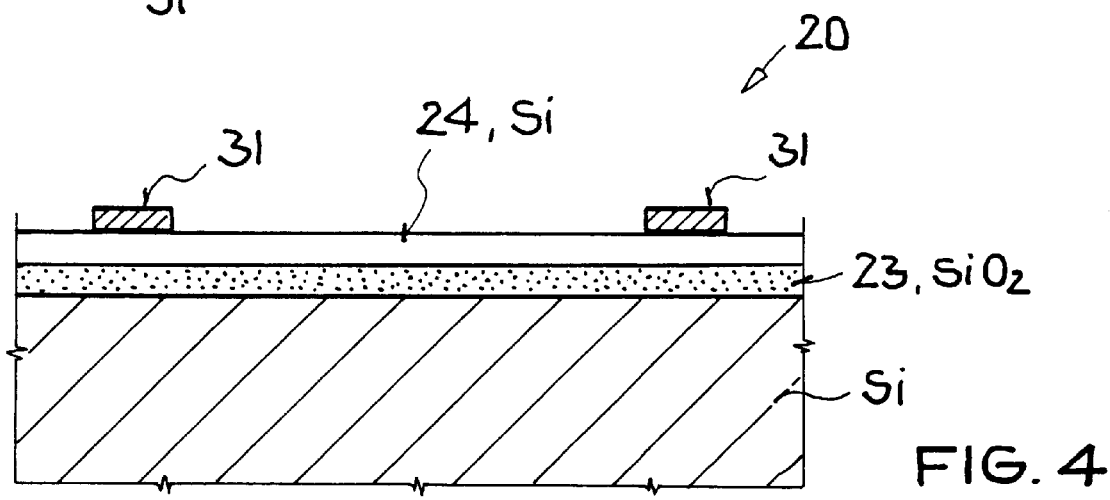
FIG. 4 is a sectional view through the second wafer with metallization.

FIG. 4 shows how, by means of a known photolithographic process, a well conducting ring structure 31 preferably of aluminum or germanium is placed on the silicon layer 24 of the SOI wafer 20. The purpose of this is to form a wafer bonding 2 (FIG. 7) in conjunction with the corresponding ring structure 11 (FIG. 1) arranged on wafer 10.

Figure 5:
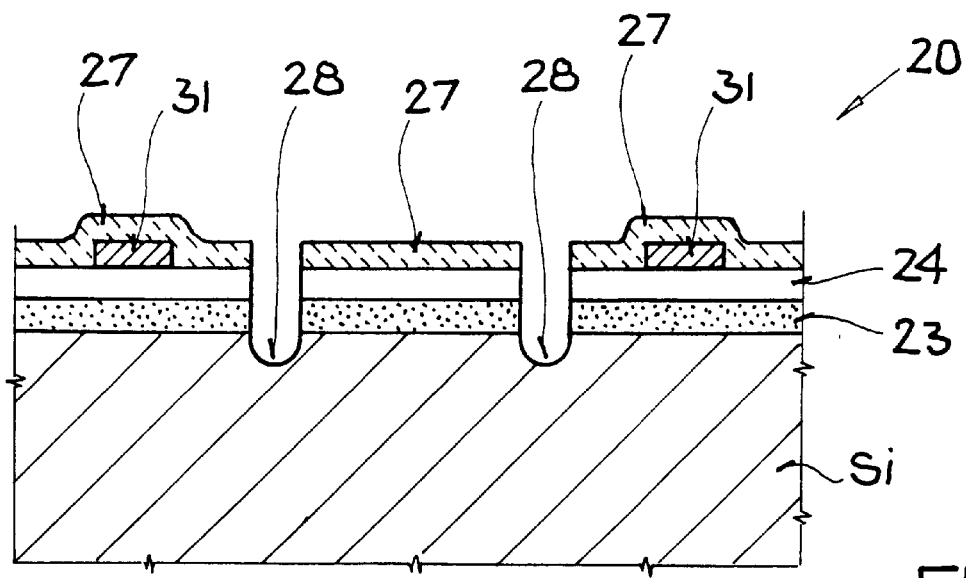
FIG. 5 is a sectional view through the second wafer with a masking layer.

In FIG. 5 the SOI wafer 20 can be seen at a later point of time in the manufacturing process. The surface of the SOI wafer 20 is structured by means of a photoresist 27 applied for the purpose of masking to the silicon layer 24 and the ring structure 31. First of all, a plasma etching method is used to etch trenches 28 through the insulating layer 23 and the silicon layer 24 into the surface of the SOI wafer 20. These trenches 28 form the contour of the rocker 21 that must be produced (FIG. 2).

Figure 6:
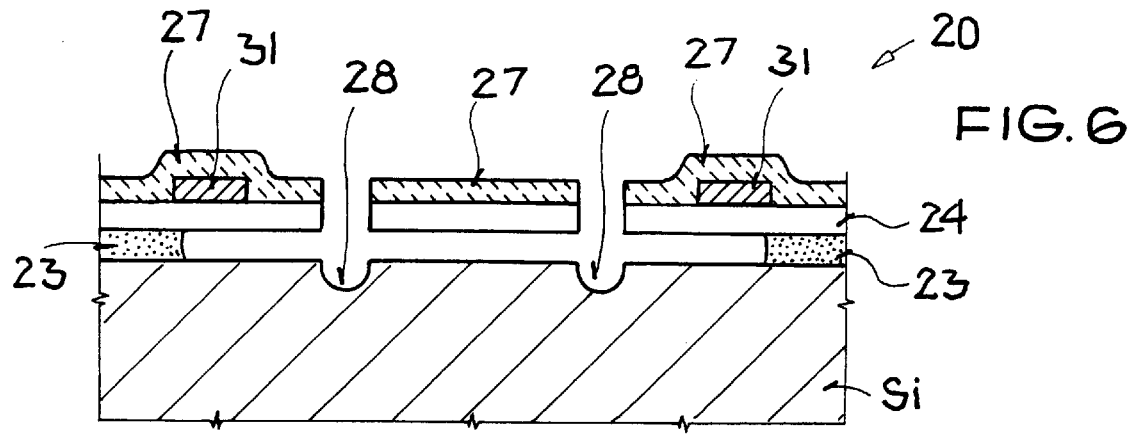
FIG. 6 is a sectional view through the second wafer during a further etching operation.

Then, as shown in FIG. 6, the insulating layer 23 is removed by wet chemical means, using hydrofluoric acid for example, thereby freeing the structure of the rocker 21. If underetching of the silicon layer 24 occurs due to certain circumstances in the process, this has no further effect and can be accepted. When the rocker 21 has been etched free, the photoresist 27 is removed and the SOI wafer 20 is cleaned.

Figure 7:
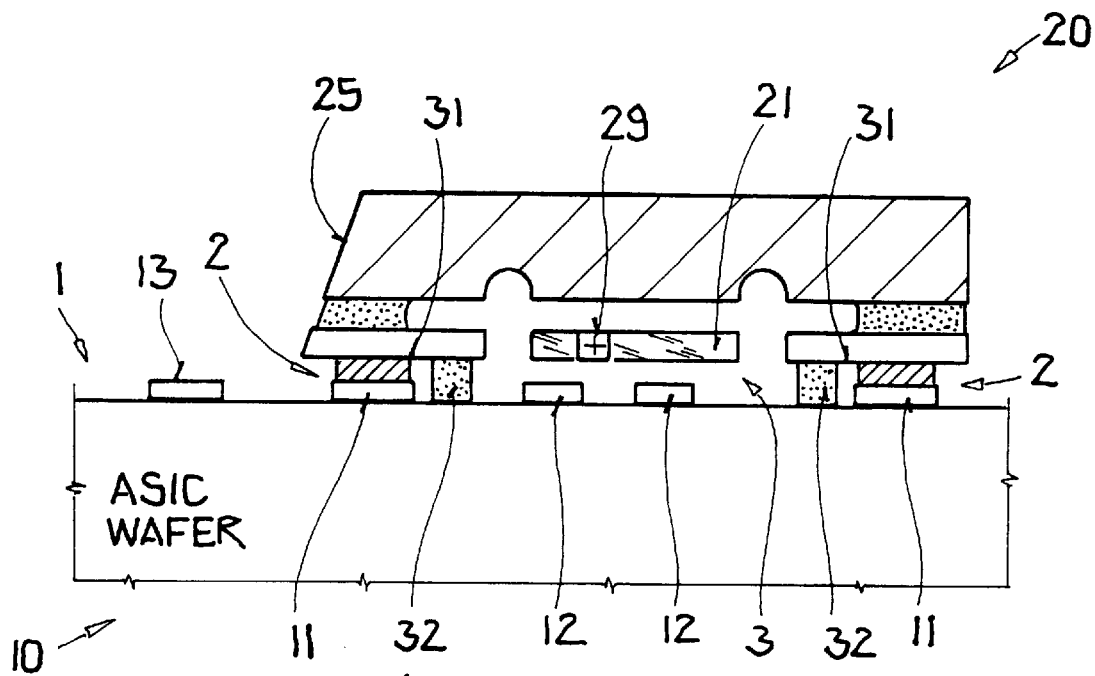
FIG. 7 is a sectional view through both wafers during bonding.

In order to obtain a capacitive acceleration sensor 1 shown in FIG. 7, the silicon wafer 10 and the SOI wafer 20 must be connected together. This is done by placing the two wafers 10 and 20 one on top of the other in such a way that the ring structure 11 of silicon wafer 10 and the ring structure 31 of SOI wafer 20 lay one on top of the other. A wafer bonding 2 is then produced between the wafers 10 and 20 at a specific temperature and under pressure. The wafer bonding 2 results in a hermetically sealed cavity 3 within the acceleration sensor 1. The rocker 21 and the electrodes 12 are located in this cavity 3.

The electrodes 12 are connected to the integrated circuit (not shown in the Figures) by a known method (metal/polysilicon or metal/monosilicon transitions).

The electrodes 12 and the ring structure 11 are insulated dielectrically from each other and from substrate 20 by insulation layers (e.g. silicon dioxide or silicon nitride).

If during the manufacturing process spacers 32 are produced on the SOI wafer 20, preferably within the ring structure 31, an exact distance is maintained between the SOI wafer 20 and the silicon wafer 10.

Figure 8:
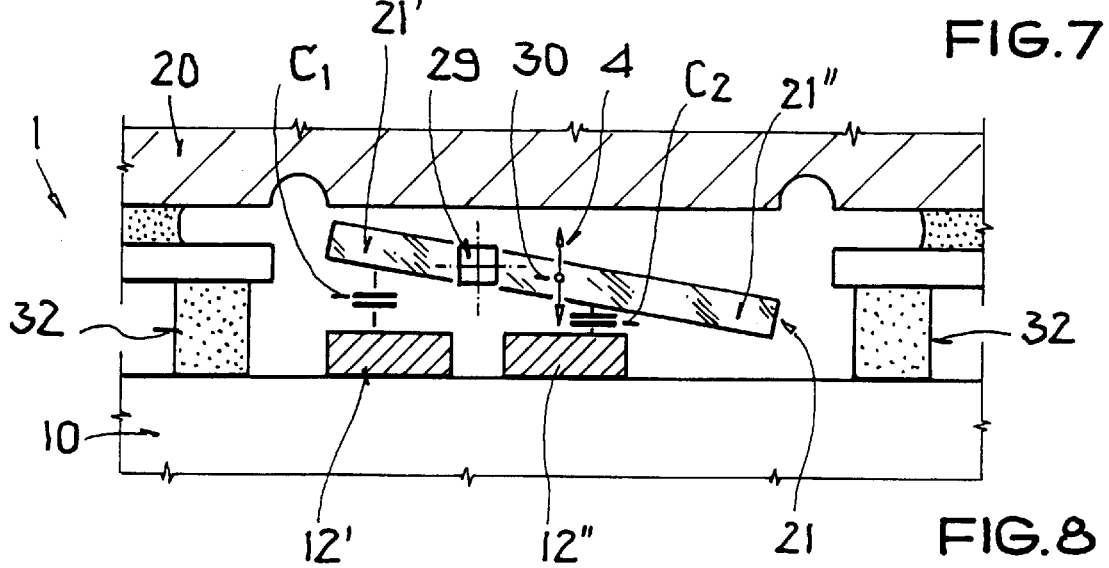
FIG. 8 is a schematic drawing showing the principle of operation of the acceleration sensor.

FIG. 8 shows in sketch form how the acceleration sensor 1 functions. Due to the asymmetric location of the axis of rotation 29, the rocker 21 is made up of a shorter part 21' and a longer part 21". The electrode 12' of silicon wafer 10 is situated electrically insulated opposite the rocker part 21' and the electrically insulated electrode 12" opposite the rocker part 21". The arrangement of rocker part 21' and electrode 12' provides a capacitor $C_1$ and the arrangement of rocker part 21" and electrode 12" provides a capacitor $C_2$. The rocker 21 is connected to the reference potential through the metallic wafer bond connection 2.

When an acceleration force acts in one of the two directions marked by an arrow 4, the rocker 21, which represents an inertial mass, moves about its axis of rotation 21.

If, for instance, an acceleration force acts downwards on the acceleration sensor 1 in the direction of arrow 4, then rocker 21, which represents an inertial mass, rotates counterclockwise about its axis of rotation 29. The distance between electrode 12' and rocker part 21' reduces so that the capacitance of capacitor $C_1$ increases. At the same time, the distance between electrode 12" and rocker part 21" increases so that the capacitance of capacitor $C_2$ decreases.

This opposing change in capacitance of $C_1$ and $C_2$ caused by the action of an acceleration force can be registered by an evaluation circuit and further processed.

Figure 9:
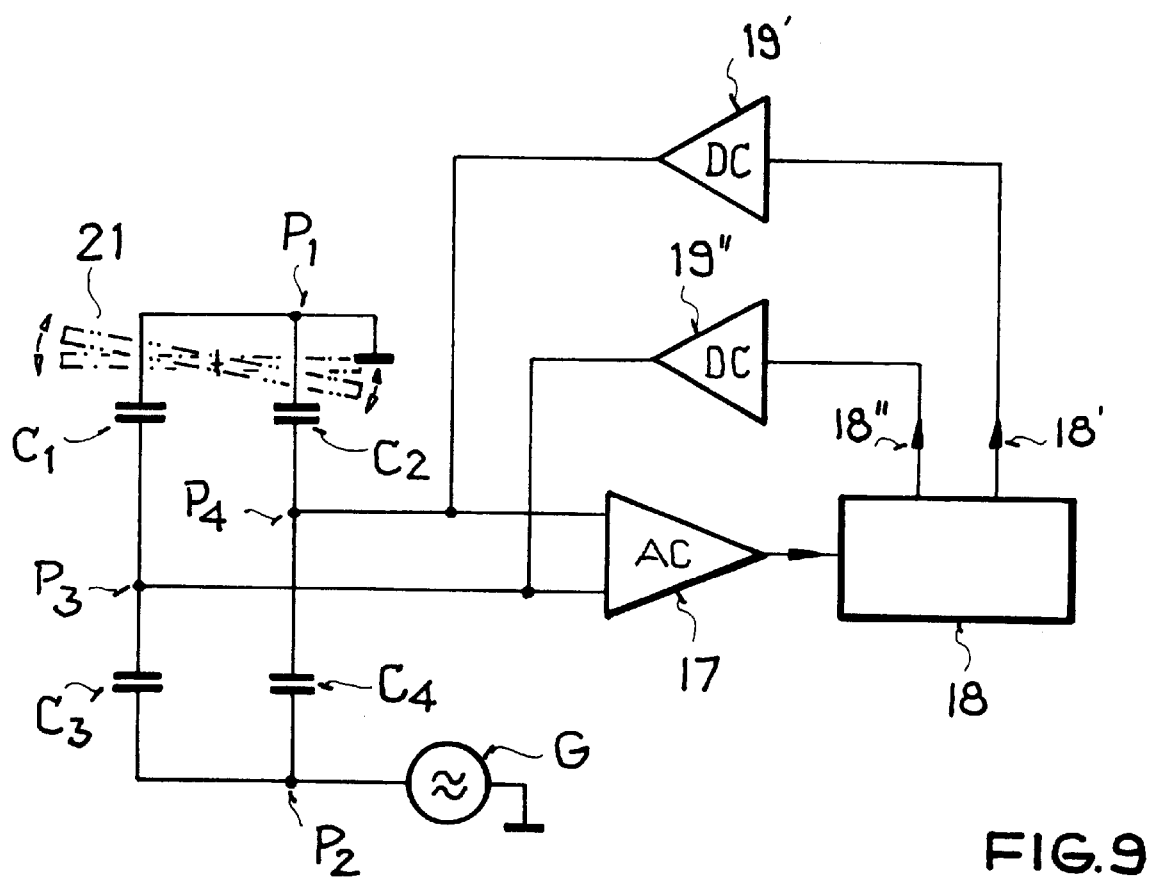
FIG. 9 is a schematic diagram of an evaluation circuit.

An embodiment example of a suitable evaluation circuit 5 is sketched in FIG. 9. $C_1$ and $C_2$ are the two capacitances of the acceleration sensor 1 (FIG. 8) which are varied by an acceleration force acting on it. One electrode of $C_1$ and one electrode of $C_2$ are connected together and form a circuit point $P_1$. The other electrode of $C_1$ is connected with one electrode of a coupling capacitor $C_3$ in a circuit point $P_3$ and the other electrode of $C_2$ is connected with one electrode of a coupling capacitor $C_4$ in a circuit point $P_4$. The other electrode of $C_3$ and the other electrode of $C_4$ are connected together in a circuit point $P_2$.

The circuit points $P_1$, $P_2$, $P_3$, $P_4$ form a capacitive bridge circuit consisting of the two capacitors $C_1$ and $C_2$ of the acceleration sensor 1 (FIG. 8) and the two coupling capacitors $C_3$ and $C_4$ of the evaluation circuit 5. An alternating current generator G, of which one electrode is connected to the reference potential, supplies an a.c. voltage to the circuit point $P_2$ whereas the circuit point $P_1$ is at reference potential.

When the bridge circuit is balanced, i.e. when no acceleration force acts on the acceleration sensor, the voltage difference between circuit point $P_3$ and circuit point $P_4$ is zero. In all other cases, the voltage difference between the circuit points $P_3$ and $P_4$ is a measure of the acceleration force acting on the acceleration sensor.

The voltage difference that arises between the circuit points $P_3$ and $P_4$ is directly proportional to the acting acceleration force and is fed to an a.c. amplifier 17. The output signal from this a.c. amplifier 17 is in turn fed to a regulating circuit 18. The object of the regulating circuit 18 is, on the one hand, to eliminate any d.c. voltage component from the signal resulting from an acceleration force between $P_3$ and $P_4$ and amplified by means of the a.c. amplifier 17 and, on the other hand, to supply for further processing the voltage created between the circuit points $P_3$ and $P_4$ as a result of the acceleration force to circuit elements connected on the output side.

A third object is for the regulating circuit 18 to ensure that the rocker 21 (FIG. 8) remains in the mid-position (normal position) at all times in order to be able to register accelerations in both of the directions marked by the arrow 4 (FIG. 8). For this purpose, it has two outputs 18' and 18" each of which allow a d.c. voltage to be supplied to the inputs of d.c. amplifier 19' and d.c. amplifier 19" respectively. The output of the d.c. amplifier 19' is connected to the circuit point $P_4$ and the output of the d.c. amplifier 19" is connected to the circuit point $P_3$. By feeding a d.c. voltage to the circuit points $P_3$ or $P_4$, and hence to the electrodes 12' or 12" (FIG. 8), the rocker 21 (FIG. 8) can be moved by electrostatic force in one of the two directions marked by the arrow 4 (FIG. 8).

The regulating circuit 18 then detects the actual position of the rocker 21 (FIG. 8) from the subsequent change in capitance of the capacitors $C_1$ and $C_2$ so that a closed circuit is created.

This also provides the means for the acceleration sensor to perform a self-test by supplying a d.c. pulse to the electrodes 12' and 12" (FIG. 8) and by the regulating circuit 18 checking whether the intended change in position of the rocker 21 (FIG. 8) has taken place.

What is claimed is:

1. Acceleration sensor comprising a first silicon semiconductor wafer; a microelectronic evaluation unit including first and second electrodes for creating a variable capacitance on a first surface of the first semiconductor wafer; a second SOI semiconductor wafer having a movable third electrode formed therein, with said second semiconductor wafer being mounted on said first surface of said first semiconductor wafer such that said moveable electrode is disposed opposite and spaced from said first and second electrodes and is electrically connected to said evaluation unit; and wherein:

said movable electrode is a rocker suspended asymmetrically with regard to an axis of rotation such that each respective portion of the rocker on a respective side of said axis of rotation is of a different length and is opposite one of said first and second electrodes on said first surface of said first semiconductor wafer; a closed ring structure is disposed on the surface of the silicon wafer; and, the closed ring structure of the silicon wafer is made of the material of a top metallization layer of the silicon wafer.

2. Acceleration sensor, comprising a silicon semiconductor wafer; a microelectronic evaluation unit including first and second electrodes for creating a variable capacitance on a first surface of the silicon semiconductor wafer; an SOI semiconductor wafer having a movable third electrode formed therein, with said SOI semiconductor wafer being mounted on said first surface of said Silicon semiconductor wafer such that said moveable electrode is disposed opposite and spaced from said first and second electrodes and is electrically connected to said evaluation unit; and wherein:

said movable electrode is a rocker suspended asymmetrically with regard to an axis of rotation such that each respective portion of the rocker on a respective side of said axis of rotation is of a different length and is opposite one of said first and second electrodes on said first surface of said silicon semiconductor wafer; a closed ring structure is disposed on the surface of the silicon semiconductor wafer; and, a closed, well conducting ring structure, corresponding to the ring structure of the silicon semiconductor wafer, is arranged on the surface of the SOI semiconductor wafer and is bonded to the ring structure of the silicon semiconductor wafer.

3. Acceleration sensor in accordance with claim 2 wherein each of the first and second electrodes is made of a good conductive material of a metal or polysilicon layer of the silicon semiconductor wafer.

4. Acceleration sensor in accordance with claim 2, wherein the evaluation unit arranged on the silicon semiconductor wafer is made with the help of CMOS technology.

5. Acceleration sensor comprising a silicon semiconductor wafer; a microelectronic evaluation unit including first and second electrodes for creating a variable capacitance on a first surface of the silicon semiconductor wafer; an SOI semiconductor wafer having a movable third electrode formed therein, with said SOI semiconductor wafer being mounted on said first surface of said silicon semiconductor wafer such that said moveable electrode is disposed opposite and spaced from said first and second electrodes and is electrically connected to said evaluation unit; and wherein:

said movable electrode is a rocker suspended asymmetrically with regard to an axis of rotation such that each respective portion of the rocker on a respective side of said axis of rotation is of a different length and is opposite one of said first and second electrodes on said first surface of said silicon semiconductor wafer; a closed ring structure is disposed on the surface of the silicon semiconductor wafer and on the surface of the SOI semiconductor wafer; and, the ring structure on the SOI semiconductor wafer and on the silicon semiconductor wafer is made of aluminum or germanium.

6. Acceleration sensor comprising a silicon semiconductor wafer; a microelectronic evaluation unit including first and second electrodes for creating a variable capacitance on a first surface of the silicon semiconductor wafer; an SOI semiconductor wafer having a movable third electrode formed therein, with said second semiconductor wafer being mounted on said first surface of said silicon semiconductor wafer such that said moveable electrode is disposed opposite and spaced from said first and second electrodes and is electrically connected to said evaluation unit; and wherein:

said movable electrode is a rocker suspended asymmetrically with regard to an axis of rotation such that each respective portion of the rocker on a respective side of said axis of rotation is of a different length and is opposite one of said first and second electrodes on said first surface of said silicon semiconductor wafer; a closed ring structure is disposed on the surface of the silicon semiconductor wafer; and, spacers are arranged between the SOI semiconductor wafer and the silicon semiconductor wafer within the ring structure.

* * * * *